United States Patent [19]

Yoshioka et al.

[11] Patent Number: 4,700,237
[45] Date of Patent: Oct. 13, 1987

[54] FILM IMAGE PROCESSING APPARATUS

[75] Inventors: Kiyoharu Yoshioka; Norio Hashimoto, both of Tokyo; Hiraku Sonobe, Yokohama, all of Japan

[73] Assignee: Canon Kabushiki Kaisha, Tokyo, Japan

[21] Appl. No.: 786,638

[22] Filed: Oct. 11, 1985

[30] Foreign Application Priority Data

Oct. 15, 1984 [JP] Japan ................. 59-214391
Oct. 15, 1984 [JP] Japan ................. 59-214392
Oct. 15, 1984 [JP] Japan ................. 59-214393
Dec. 27, 1984 [JP] Japan ................. 59-273572
Dec. 27, 1984 [JP] Japan ................. 59-273573

[51] Int. Cl.⁴ ................ H04N 1/08; H04N 1/387; H04N 1/393
[52] U.S. Cl. ................ 358/287; 358/102; 358/294; 358/296
[58] Field of Search ............... 358/102, 256, 257, 296, 358/294, 287

[56] References Cited

U.S. PATENT DOCUMENTS

| 3,936,596 | 2/1976  | Inuiya    | 358/102 |
| 4,325,086 | 4/1982  | Sato      | 358/296 |
| 4,506,300 | 3/1985  | Fearnside | 358/102 |
| 4,535,365 | 8/1985  | Sakamoto  | 358/287 |
| 4,554,592 | 11/1985 | Yoshida   | 358/257 |

Primary Examiner—Howard W. Britton
Attorney, Agent, or Firm—Fitzpatrick, Cella, Harper & Scinto

[57] ABSTRACT

There is disclosed an apparatus for reading a microfilmed image for image reproduction on a hard copy or the like. The operator can designate the area of image to be read, thus enabling exact image reproduction without loss of image or without unnecessary margins.

31 Claims, 23 Drawing Figures (A4 SIZE OF PAPER)

(A3 SIZE OF PAPER)

FILM IMAGE PROCESSING APPARATUS

BACKGROUND OF THE INVENTION

1. Field of the Invention

The present invention relates to a film image processing apparatus for converting an image recorded on a film such as a microfilm, into electrical image information signals.

2. Description of the Prior Art

There are already known apparatus, such as facsimile or digital copier, in which an image of a document or a photograph is photoelectrically read by an image sensor and the obtained image information is processed in the form of electrical signals. Such electrical handling of image enables to easily achieve complex image processing which has not been possible in the prior art.

On the other hand, microfilms are widely employed for recording documents and drawings in order to reduce the storage space therefor. Thus microfilmed image has been utilized for visual monitoring through projection onto a screen, or for hard copy preparation through projection onto a photosensitive paper.

It is however recently required to read image information recorded on a microfilm by optically projecting said image and scanning said image on the image plane thereof by means of a one- or two-dimensional photoelectric image sensor.

Such requirement occurs for example in case of electrically sharpening an unclear microfilmed image, or storing a microfilmed image into a recently developed image file utilizing an optical disk or a magnetic disk.

The image information signals, obtained from an image reading apparatus for photoelectrically reading a microfilmed image, are used for example for obtaining a hard copy in a digital printer such as a laser beam printer or an ink jet printer, providing a display on a display unit such as a cathode ray tube or a liquid crystal device, or for storage in a high-density memory such as an optical disk for subsequent image processing.

However, the reading of microfilmed image is somewhat different in nature from conventional image reading for example in a digital copier. More specifically, there may result an incorrect image reading with the image sensor if the microfilm transport to the image reading position is inaccurate, thus eventually giving rise to a partially lacking image or the recording of an unnecessary image part, in the image reproduction. Also, in document reading, the size of document is usually defined by a standardized format, or, it is relatively easy to automatically recognize the size and position of the document and accordingly control the image reading operation. On the other hand, in microfilm reading, such automatic recognition of the size and position of the recorded image, since the distinction between the recorded image and the surrounding substrate area is quite difficult.

Even in case of using the microfilm of a particular format, such as 16 mm roll microfilm, the images recorded thereon may have various sizes because of variable image magnifications at microfilming, and this fact increases the difficulty in image reading.

Also in case of printing the image read from a microfilm, the printed image may become partially lacking unless an appropriate printing sheet is loaded in the printer. Naturally such inconvenience will not result if the operator of such apparatus always pays attention to the size of the printing sheet, such confirmation is rather tedious and tends to be forgotten in the daily work.

Such drawback is partly derived from a fact that the operator is unable to immediately imagine the manner of image reproduction, since the image on the microfilm is in a reduced size and has to be enlarged for printing.

Furthermore, it is often desirable to delete an unnecessary part in the image or to extract only a desired part thereof at the image reproduction, and, in such case, the designation of an image area should desirably be easily achieved. An enlarged print of an extracted image allows more detailed observation of image, but the operator is unable to judge an appropriate image magnification because the image on the microfilm is reduced in size as mentioned above. If an inappropriate image magnification is selected, the obtained image may not be properly accommodated in the printing sheet.

The above-mentioned drawbacks are not limited to the case of microfilm but also exist in reading other films such as 35 mm films or X-ray films.

SUMMARY OF THE INVENTION

In consideration of the foregoing, an object of the present invention is to provide a film image processing apparatus capable of satisfactorily and accurately processing, in electrical manner, an image recorded on a film such as a microfilm.

Another object of the present invention is to provide a film image processing apparatus capable of correctly reading, without partial lack, a desired image area recorded on a film.

Still another object of the present invention is to provide a film image processing apparatus allowing to designate a desired reading area in the image recorded on a film.

Still another object of the present invention is to provide a film image processing apparatus capable of synchronizing the image reading operation from a film with the function of an external device for processing thus obtained image signals, thus achieving secure image processing.

Still another object of the present invention is to provide a film image processing apparatus allowing the reproduction of a desired image, without partial lack thereof, on a recording material by reading said image from a film.

Still another object of the present invention is to provide a film image processing apparatus allowing to enlarge the image on a film with an image magnification corresponding to the size of a recording material, thus enabling image reproduction with satisfactory image observability.

The foregoing and still other objects of the present invention, and the advantages thereof, will become fully apparent from the following description.

DETAILED DESCRIPTION OF THE PREFERRED EMBODIMENTS

Now the present invention will be clarified in detail by embodiments thereof shown in the attached drawings.

Figure 1:
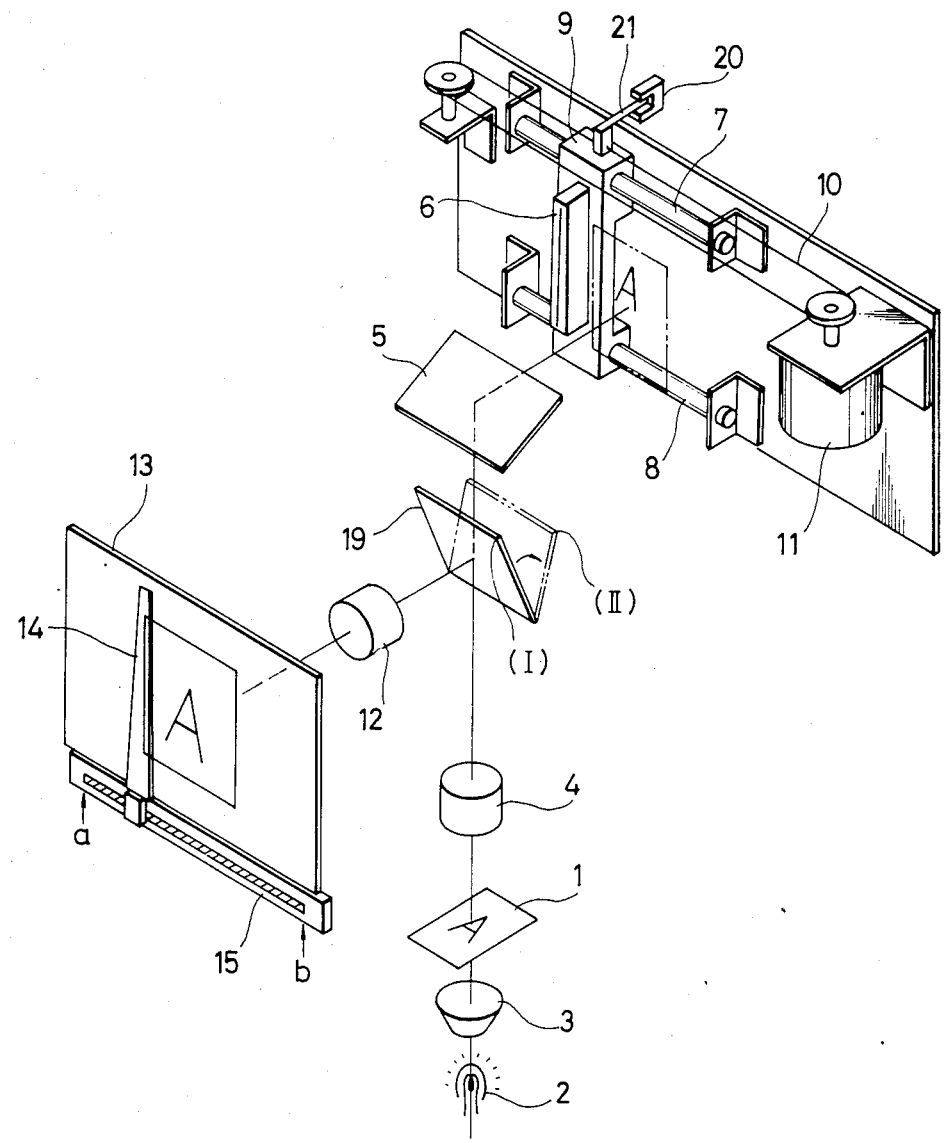
FIG. 1 is a schematic perspective view showing mechanical structure of an image reading apparatus embodying the present invention.

FIG. 1 is a schematic perspective view showing mechanical structure of an image reading apparatus embodying the present invention.

In FIG. 1, a film frame 1, bearing desired image information, is illuminated by a halogen lamp 2 and a condenser lens 3, and the projected image is focused, through an imaging lens 4 and a fixed mirror 5, onto the scanning face of a one-dimensional image sensor 6, for example composed of a charge-coupled device (CCD) in which plural photosensor elements are linearly arranged along a main scanning direction. Said linear image sensor 6 is mounted on a carriage 9 movable along guides 7, 8. A motor 11 drives a wire 10 connected to said carriage 9 to move the same in a subsidiary scanning direction which is substantially perpendicular to the main scanning direction of said linear image sensor, whereby the image sensor 6 reads the image information through line-by-line scanning operation.

The main body of the image reading apparatus is provided with a photointerrupter 20 for generating a timing signal for initiating the image reading operation, as will be explained later, when a light shield plate 21 mounted on said carriage 9 interrupts the light.

Between said imaging lens 4 and mirror 5 there is provided a switching mirror 19 which can be stabilized in one of two positions (i) and (ii), whereby the image of the film frame 1 can also be projected in enlarged form onto a screen 13 through a projection lens 12.

Figure 2:
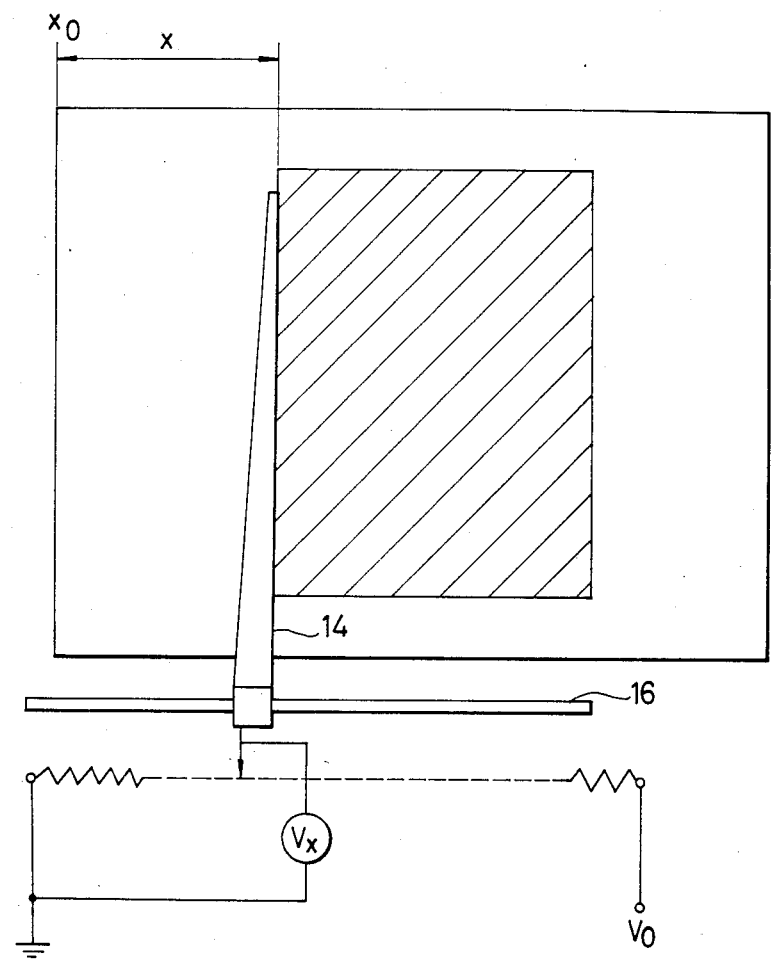
FIG. 2 is a detailed view of a screen and related parts of the apparatus shown in FIG. 1.

On said screen 13 there is provided a cursor 14 which is manually slidable, by the operator, from a point a to b along a guide 15 parallel to a side of said screen. As is detailedly shown in FIG. 2, said cursor 14 is linked to a linear potentiometer 16 for generating a voltage Vx proportional to the distance x from a reference position $x_0$ on the screen to said cursor 14.

Said cursor 14 may be composed of any opaque material or any other material of similar effect, or a transparent material which can be suitably colored for recognition.

Figure 3:
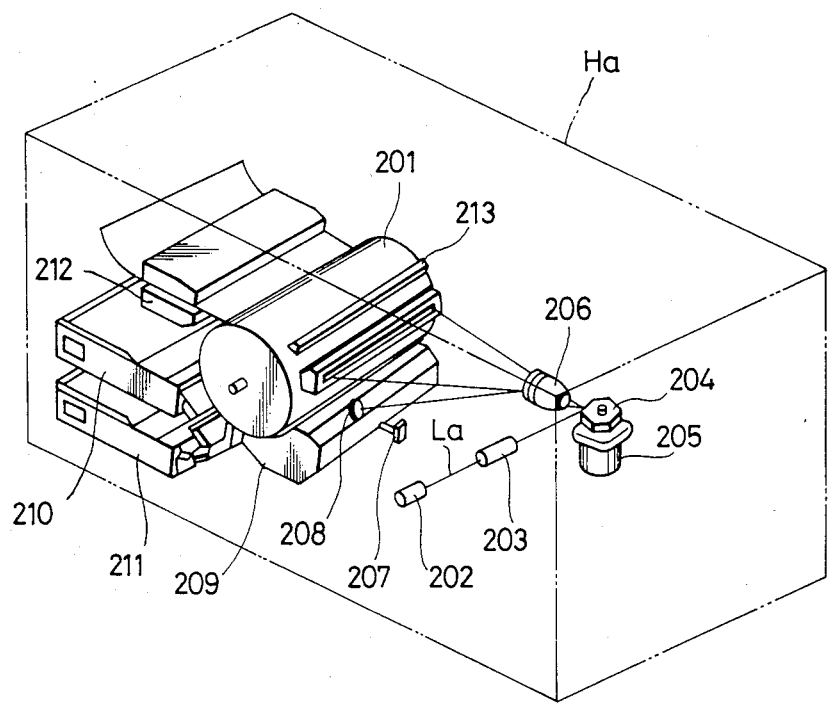
FIG. 3 is a schematic view showing a printer as an output device for image signals.

FIG. 3 is a perspective view showing a laser beam printer, constituting an example of image processing apparatus for the image signals from the image reading apparatus.

Said printer, utilizing an electrophotographic process combined with laser beam, is provided with a photosensitive drum 201, rotatably supported in a housing Ha. In response to input image signals, a semiconductor laser 202 emits a modulated laser beam La, which is expanded to a predetermined beam diameter through a beam expander 203. Said beam then enters a polygonal mirror 204, which is provided with plural mirror faces and is rotated by a constant-speed motor 205 at a determined speed. By means of said polygonal mirror 204, the laser beam emerging from the beam expander 203 performs a substantially horizontal scanning motion, and is focused, by an f-$\theta$ lens 206, as a light spot on the photosensitive drum 201 which is in advance charged to a determined polarity by a charger 213.

A beam detector 207 detects the laser beam reflected by a mirror 208, and the detection signal from said beam detector is used for determining the timing of modulation by the semiconductor laser 202 for supplying desired optical information to said photosensitive drum 201.

The laser beam scanning forms an electrostatic latent image of a high resolution on the photosensitive drum 201. Said latent image is rendered visible in a developing unit 209, and is transferred onto a recording sheet supplied from a cassette 210 or 211. The sheet then passes a fixing unit 212 to fix said image to the sheet, and is subsequently discharged, as a hard copy, onto an unrepresented discharge unit.

The sizes of the recording sheets stored in said cassettes 210, 211 are transmitted to a controller to be explained later. According to the selection of the size of the recording sheet made by the operator, either of said cassette 210, 211 is selected and the recording sheet is supplied to the recording unit by unrepresented feed rollers.

Figure 4:
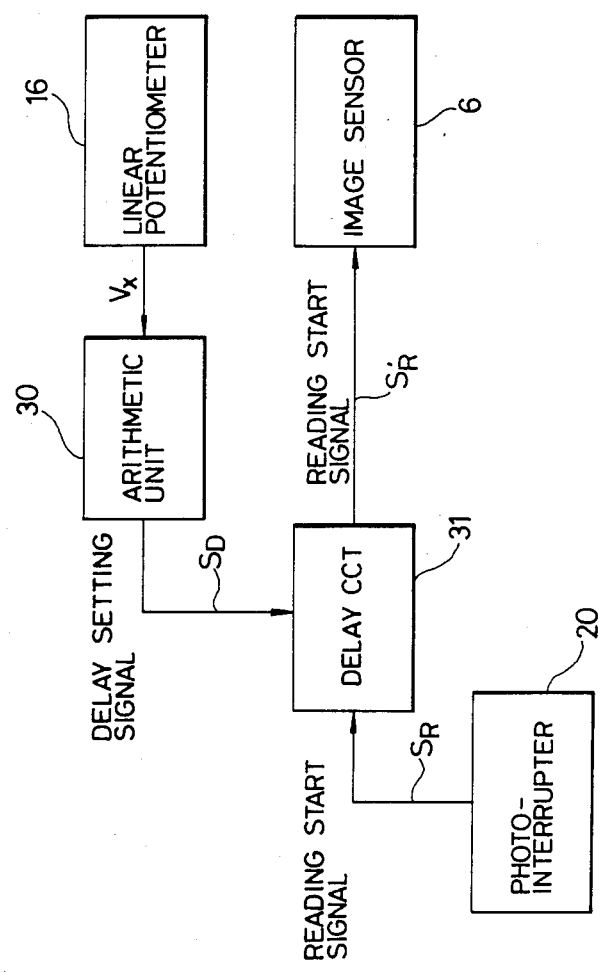
FIG. 4 is a block diagram showing the principal part of a control circuit employed in the apparatus shown in FIG. 1.

FIG. 4 shows a control circuit of the present embodiment, wherein an arithmetic unit 30 supplies a delay circuit 31 with a delay setting signal $S_D$. More specifically, the arithmetic unit 30 calculates a delay time for obtaining a reading start signal $S'_R$ to be supplied from the photointerrupter 20 to a linear image sensor 6, in response to the output voltage Vx of the linear potentiometer 16.

The delay time $t_x$ corresponding to the position of the cursor 14 is related to the output voltage $V_x$ through an equation:

$$t_x = \frac{V_x}{V_0} \cdot T$$

wherein $V_0$ is a potential given to the linear potentiometer 16, and T stands for a time required by the image sensor 6 to perform the subsidiary scanning motion from the position of the photosensor 20 to a maximum reading range.

Thus the arithmetic unit 30 determines the delay time $t_x$ from the output $V_x$ of the linear potentiometer 16 according to the above-mentioned equation, and supplies the delay circuit 31 with the value of said delay time as the delay setting signal $S_D$.

The delay circuit 31 delays a reading start signal $S_R$ from the photointerrupter 20 by the delay time instructed by the arithmetic unit 30, and supplies the linear image sensor 6 with thus delayed reading start signal $S'_R$, in response to which said image sensor 6 initiates the image reading operation.

In the image reading operation in the above-described apparatus, the operator at first moves the cursor 14 to the left-hand end of an image displayed on the screen 13, and then instructs the start of image reading operation, for example through a keyboard. In response the motor 11 is activated, and the linear image sensor 6 mounted on the carriage 9 starts to move in the subsidiary scanning direction. In this state, however, the image sensor 6 does not yet perform the image reading operation nor release the image signals.

When the light shield plate 21 interrupts the light in the photointerrupter 20 in the course of movement of linear image sensor 6 in the subsidiary scanning direction, the reading start signal $S_R$ is supplied to the delay circuit 31, which thereby sends the reading start signal $S'_R$ to the linear image sensor 6 after a delay time $t_1$ calculated by the arithmetic unit 30 according to the voltage $V_x$ of the linear potentiometer 16 corresponding to the position of the cursor 14. In response the linear image sensor 6 starts the image reading and supplies image signals to the printer shown in FIG. 3.

In this manner the cursor 14 is moved according to the image displayed on the screen 13, and the start position for image reading is regulated by changing the start timing of image reading by the image sensor according to a signal corresponding to the position of said cursor.

As explained in the foregoing, the start position of image reading by the image sensor can be appropriately selected according to the displayed image on the screen, so that it is rendered possible to prevent partial lack of the read image or avoid reading unnecessary image area, often resulting from incorrect transport of the microfilm.

The image signals from the image reading apparatus may also be employed, in addition to the supply to the printer as explained before, for supply to an image file utilizing a magnetooptical disk or to a computer, for the purpose of various data processing.

In the foregoing there has been explained an embodiment in which an appropriate image reading is rendered possible according to the instruction through a cursor. In the following there will be explained an embodiment in which the appropriate image output signals thus obtained are corelated with the function of an external apparatus.

Figure 5:
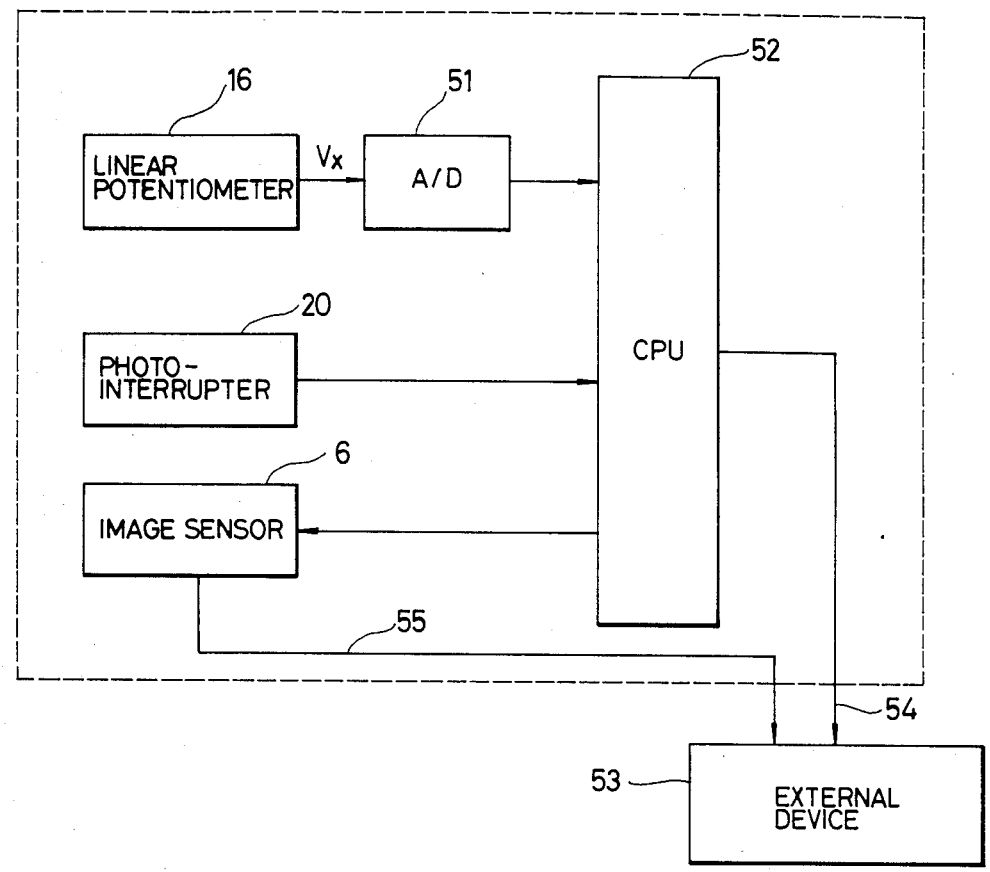
FIG. 5 is a block diagram showing the principal part of a control circuit representing another embodiment.

FIG. 5 is a block diagram of a control circuit of the present embodiment, wherein the image reading apparatus shown in FIG. 1 is connected to an external apparatus such as a laser beam printer. An output voltage $V_x$ obtained from the linear potentiometer 16 corresponding to the position of the cursor 14 is supplied, through an analog-to-digital converter 51, to a CPU 52 principally composed of a known microcomputer. Also an output signal of the aforementioned photointerrupter 20 is supplied to the CPU 52, which controls the image reading operation of the image sensor 6 according to a control procedure stored in an incorporated read-only memory (ROM), and supplies the external apparatus 53 with an image transmission start signal 54. Also the image output signals 55 of the linear image sensor 6 are supplied to said external apparatus 53.

Figure 6:
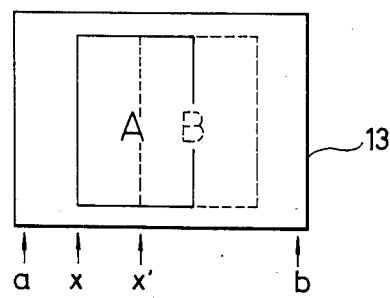
FIG. 6 is a schematic view showing the relationship between an image projected on a screen and a cursor.

FIG. 6 shows the relationship between an image, represented by characters "A" and "B", projected on the screen 13 and the position of the cursor. In the present embodiment, an adjustment is so made in advance that the scanning start position of the linear image sensor 6 determined by the photointerrupter 20 coincides optically with a point a of the cursor 14.

Figure 7:
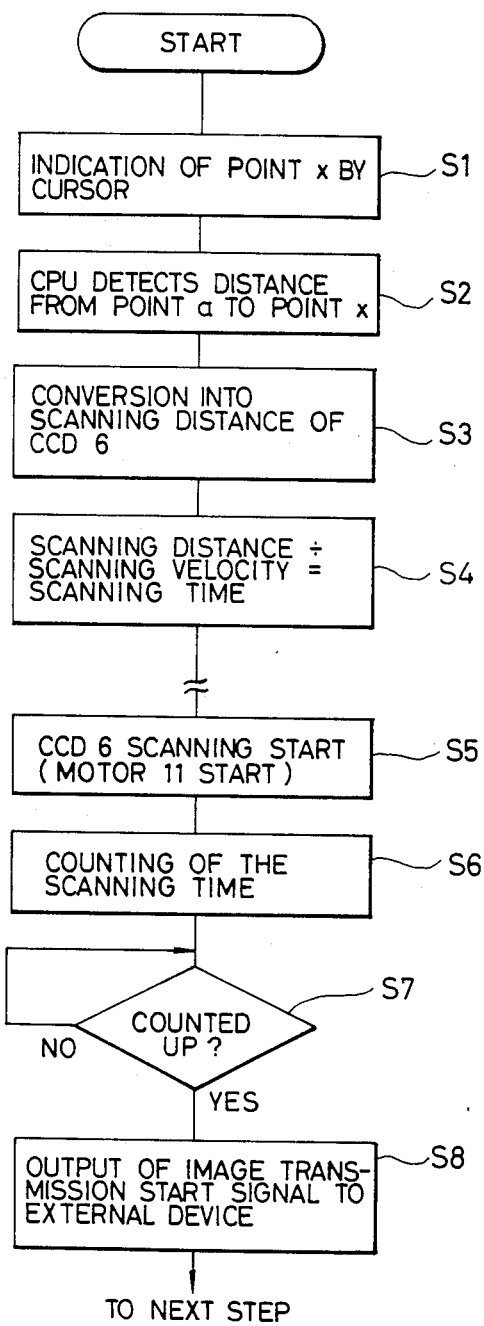
FIG. 7 is a flow chart showing the control procedure.

In the following there will be given an explanation on the function of the present embodiment, while making reference to FIG. 7 in which steps S1 to S8 indicate control procedure of the CPU 52.

It is assumed that a full-lined image A is shown on the screen 13. At first, in order to define a start position for said image "A", the cursor 14 is moved to a point x (step S1), whereupon the CPU 52 converts the voltage $V_x$ from the potentiometer 16 into the scanning distance of the linear image sensor 6 (steps S2 and S3). Then the CPU 52 determines the scanning time, by dividing said scanning distance with the scanning speed (step S4).

The supply of image information signals corresponding to said image A and of image transmission start signal to the external apparatus 53 according to the following sequence. At first the scanning operation of the linear image sensor 6 is initiated by activating the motor 11 (step S5). Then, after counting a time corresponding to the distance from a to x defined by the cursor 14 (steps S5 and S6), the CPU 52 supplies the image transmission start signal 54 to the external apparatus 53 (step S8). Said start signal 54 enables the external apparatus 53 for receiving the image information signals. In case of a printer shown in FIG. 3, it initiates image recording corresponding to the entered image signals.

Also in case the image B represented by broken lines, with a start position x', is projected on the screen 13 as shown in FIG. 6, the coordinates of said point x' are detected in a similar manner and the output timing of the image transmission start signal 54 is appropriately regulated by the CPU 53.

In the foregoing embodiments, an optical screen is employed as display means, and the position of image thereon is detected by a cursor linked with a potentiometer. The present invention is however not limited to such embodiments, and it is also possible for example to employ a cathode ray tube as display means and a digitizer for detecting the image position.

In this manner, synchronization between the image reading by the image sensor 6 and the image processing in the external apparatus can be achieved by moving the cursor 14 to the position of the displayed image, thereby controlling the start of image reading by said image sensor 6 and the start of transmission of image information signals to the external apparatus 53. Consequently, the read image can be reproduced in an appropriate position on a recording material.

As explained in the foregoing, the output timing of the image transmission start signal to the external apparatus can be regulated corresponding to a desired area of the image, and there can therefore be obtained various advantages such as effective determination of the timing of sheet registration in a digital printer, or elimination of unnecessary information storage in a memory.

In the foregoing embodiment, the image reading by the image sensor 6 is started from a position designated by the cursor. In the following there will be explained another embodiment in which the end point of image reading is controlled according the position of the cursor.

Figure 8A:
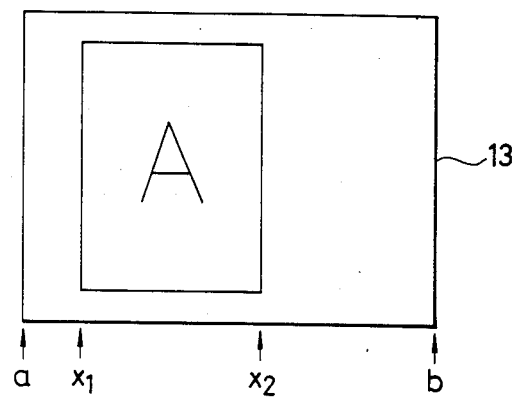
FIGS. 8(A) and 8(B) are schematic views showing the positions of image displayed on the screen.
Figure 8B:
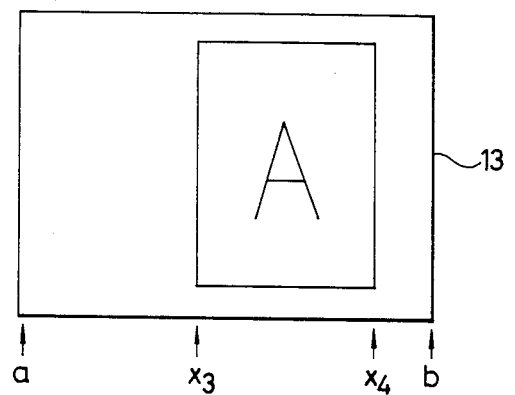

Let us consider a case in which an image "A" is projected on the screen 13, at a position shown in FIG. 8(A) or another position in FIG. 8(B). The aforementioned cursor 14 is positioned at the front end x1 or x3 of the image respectively in the case (A) or (B), so that the image transmission start signal is released when the linear image sensor 6 reaches, in the subsidiary scanning motion thereof, said front end position x1 or x3 respectively in the case (A) or (B).

In these cases, the scanning motion of the linear image sensor 6 can naturally be extended to the right-hand end b of the screen 13, but it is desirable to terminate the transmission of the image signals and to reverse the scanning motion at the rear end x2 or x4 of the image respectively in the case (A) or (B), since further scanning motion is unnecessary.

Figure 9:
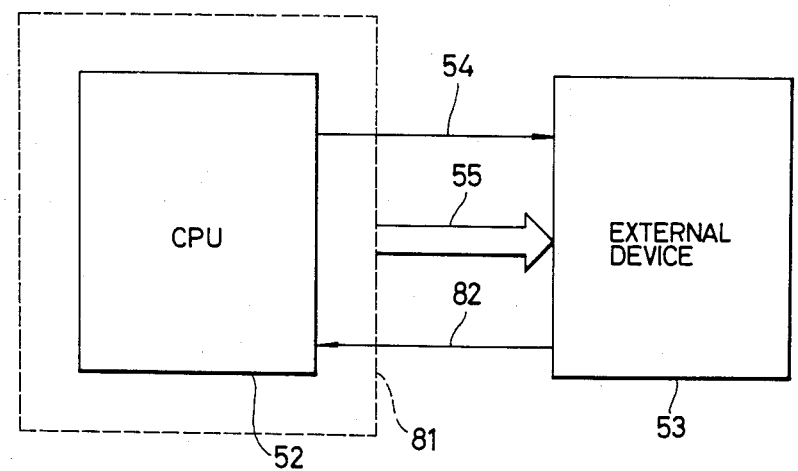
FIG. 9 is a block diagram showing a control circuit of another embodiment.

FIG. 9 is a schematic view showing the structure of the present embodiment, by the signals exchanged between the image reading apparatus and the external apparatus. The structure relating to the cursor and image reading is same as shown in FIG. 5 and is therefore omitted. In the embodiment shown in FIG. 9, an external apparatus 53, such as a digital printer or a display device, supplies the microfilm reading apparatus 81 with a synchronization signal 82, for synchronizing the printing operation of the digital printer 53 with the scanning operation of the linear image sensor along the array of photosensor elements thereof, i.e. the main scanning operation. In FIG. 9 there are further shown the aforementioned image transmission start signal 54, and the image signals 55 same as shown in FIG. 5.

In case said external apparatus 53 is composed for example of a printer with a recording density of 16 pel, said image synchronization signal 82 is supplied 16 times from the printer 53 to the CPU 52 of the reading apparatus 81, during printing operation for 1 mm in the subsidiary scanning direction. In the printer shown in FIG. 3, the beam detector 207 releases a detection signal for each laser scanning operation, and said detection signal is supplied as said image synchronization signal to the CPU 52.

Thus, if the image "A" shown in FIG. 8(A) is A4-sized, with a lateral length of 210 mm, the image signals 55 can be transmitted while the CPU 52 receives said image synchronization signal $16\times210$ times. Naturally the subsidiary scanning speed of the linear image sensor 6 along the guide 7 is maintained in relation to the sheet advancing speed in the printer 53.

Figure 10:
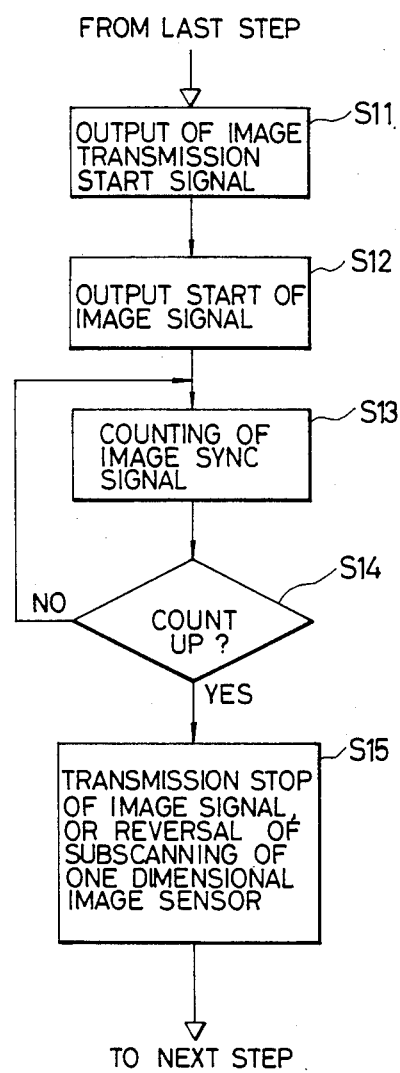
FIG. 10 is a flow chart showing an example of the control procedure stored in a central processing unit shown in FIG. 9.

Now reference is made to a flow chart shown in FIG. 10. In case of FIG. 8(A), the image transmission start signal 54 is released at the lead-hand end x1 of the desired image (step S11) to initiate the transmission of the image signals 55 (step S12). At the same time the CPU 52 starts counting of the image synchronization signals 82 (step S13), and, when said count reaches a value $16\times210$ (step S14) when the image sensor 6 is positioned at the right-hand end x2 of the desired image, the scanning motion is reversed or the transmission of the image signals 55 is terminated (step S15).

A similar procedure is executed also in case of FIG. 8(B). It is also possible to designate the size of the desired image by unrepresented keys in the image reading apparatus 81 and store said size in the CPU 52. In the foregoing explanation, the size of the image "A" is assumed as A4 size, but it is not limited to this particular size, and the count of the synchronization signals may be suitably changed according to the contemplated size. It is furthermore possible to define the coordinates x1 and x2, or x3 and x4 by means of a pair of cursors 14, or a cursor 14 and unrepresented keys, thus calculating the distance between x1 and x2, or x3 and x4 by the CPU 52 and accordingly modifying the count of the image synchronization signals 82.

In the foregoing explanation it is further assumed, for the purpose of simplicity, that the image magnification is always constant, but the present invention is naturally applicable to a case in which the image magnification is rendered variable by suitable image magnifying means.

As explained in the foregoing, the image synchronization signals are counted from an output timing of the image transmission start signal which is variable according to the position of image area recorded on a microfilm, and the scanning operation is terminated or reversed when said count reaches a predetermined value. Consequently an effective image transmission can be achieved by limiting the scanning operation to an area corresponding to the necessary image signals to be transmitted.

In the foregoing there has been explained an embodiment in which the image reading start position or image reading range in the subsidiary scanning direction is designated by a cursor, and the image reading and recording operations are controlled according to said designation. In the following there will be explained another embodiment, in which the image reading area is designated not only in the subsidiary scanning direction but also in the main scanning direction through the use of an additional cursor, whereby the image reading apparatus can extract a desired area from the displayed image, as well as the control of start position for image reading.

Figure 11:
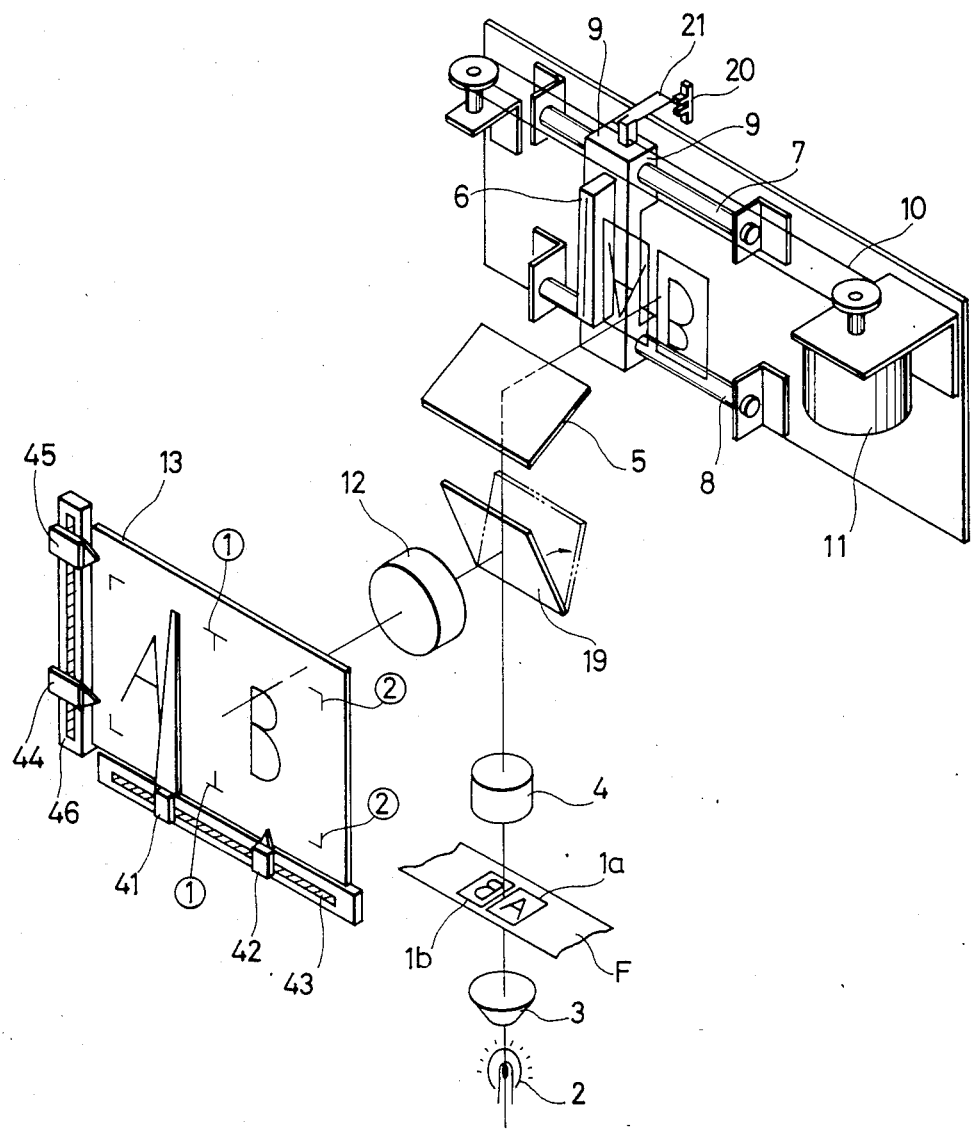
FIG. 11 is a perspective view showing the principal part of a second embodiment of a microfilm image reproducing apparatus of the present invention.
Figure 12:
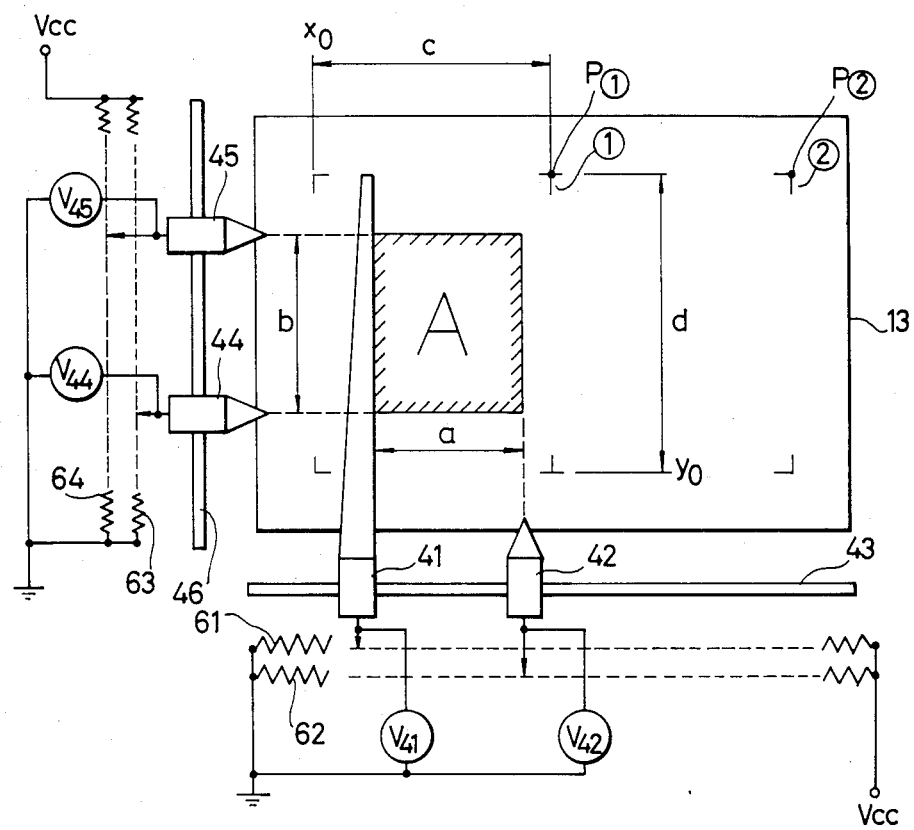
FIG. 12 is a plan view showing an example of designating means, for designating the image reading area, attached to the display means shown in FIG. 11.

FIG. 11 is a schematic perspective view of a second embodiment of the image reading apparatus, giving emphasis on the image reading means, and FIG. 12 is a more detailed front view of display means shown in FIG. 11. In FIGS. 11 and 12, same components as those in FIG. 1 are represented by same numbers and are omitted from the following description.

On the screen 13 there are printed a reading frame (1) for a half-sized image, and another reading frame (2) for a full-sized image. In case the recording sheet loaded in the laser beam printer shown in FIG. 3 is vertically or laterally oblong, the half-sized frame area (1) or full-sized frame area (2) is respectively read for printing in said laser beam printer.

As shown in FIG. 11, mutually orthogonal guide members 43, 46 are provided along the lower side and left-hand side of the screen 13.

On said guide member 43 there are mounted, as indicators for defining the image reading range in the lateral direction, a substantially rectangular cursor 41 and a pointed cursor 42, both slidable in the lateral direction along the lower side of the screen 13. Said cursors 41, 42 are electrically connected to sliders of so-called linear potentiometer which show linear change in resistance, and are connected to a power source Vcc at an end thereof and grounded at the other end.

Consequently the linear potentiometers 61, 62 respectively release voltages $V_{41}$, $V_{42}$ proportional to the distances from a reference position $x_o$ on the screen 13 to the respective cursors 41, 42. Said voltage $V_{41}$ is converted into a moving distance L of the carriage 9 from the photointerrupter 20 for generating the reading start signal (cf. FIG. 18), and the thus converted value is stored in a memory as will be explained later. On the other hand, the voltage $V_{42}$ is also stored in a memory as a value indicating the rear end of the image reading range in the lateral direction.

On said guide member 46 there are mounted, as indicators for defining the image reading range in the vertical direction, pointed cursors 44, 45, both slidable in the vertical direction along the left-hand side of the screen 13. Said cursors 44, 45 are electrically connected to sliders of linear potentiometers 63, 64 which are connected to the power source Vcc at an end thereof and grounded at the other end.

Figure 18:
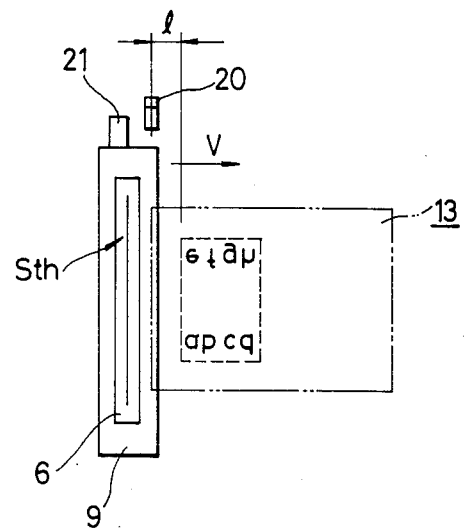
FIG. 18 is a schematic view showing the function of a carriage.

Consequently the linear potentiometers 63, 64 respectively release voltages $V_{44}$, $V_{45}$ proportional to the distances from a reference position $y_o$ on the screen 13 to the respective cursors 44, 45. Said voltage $V_{44}$ is used for determining the address S of an element in the linear image sensor 6 corresponding to the position of the cursor 44 as shown in FIG. 18, and said address S is stored in a memory. Similarly an address corresponding to the voltage $V_{45}$ is also stored in a memory.

Figure 13A:
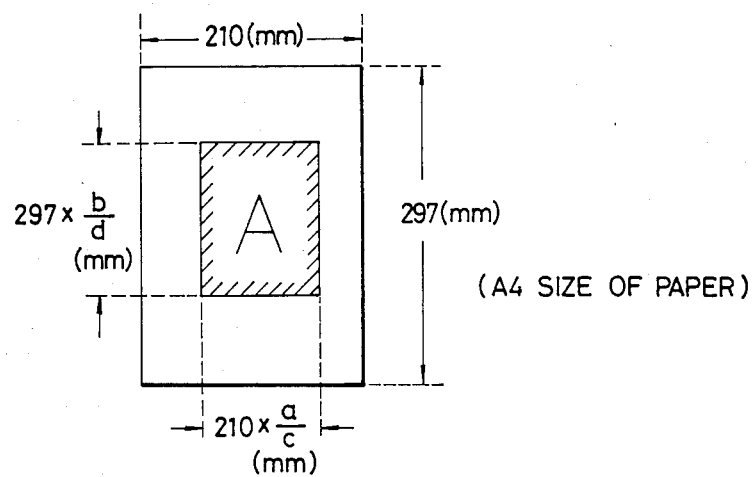
FIGS. 13(A) and 13(B) are plan views showing the relationship between the image reading area and the size of recording sheet.
Figure 13B:
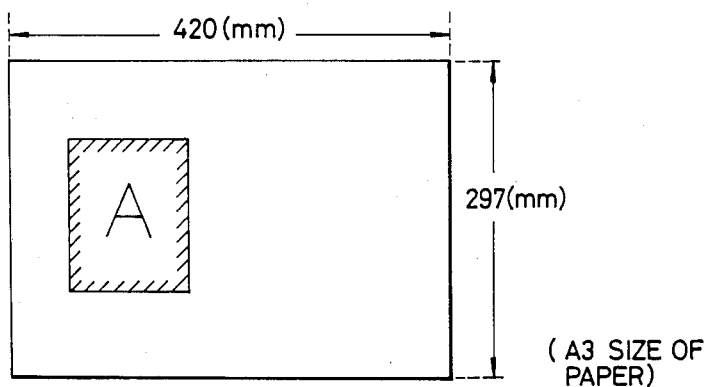
Figure 14:
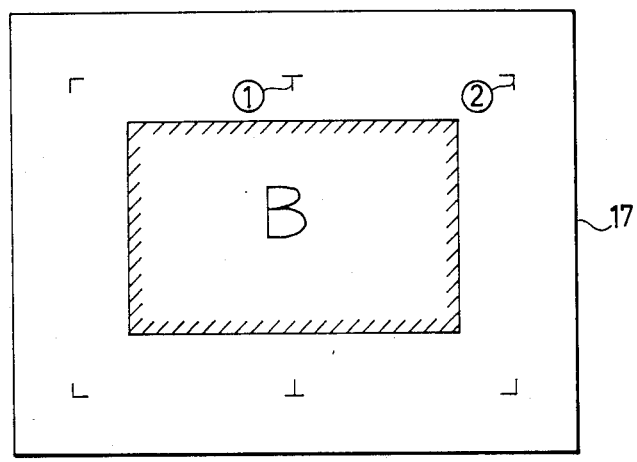
FIG. 14 is a plan view showing the relationship between the image and an image reading frame on said display means.

Referring to FIG. 12, the output voltages $V_{41}$, $V_{42}$, $V_{44}$, $V_{45}$ respectively proportional to the distances from the reference position $x_o$ or $y_o$ to the cursors 41, 42 or 44, 45 respectively correspond to lengths $l_{41}$, $l_{42}$, $l_{44}$, $l_{45}$ on the recording sheet of the printer. When the point P(1) and P(2) on the screen respectively correspond to the lengths of A4 and A3 sizes on the recording sheet, there will be obtained $x_{P(1)}=210$ (mm), $y_{P(1)}=297$ (mm), $x_{P(2)}=420$ (mm) and $y_{P(2)}=297$ (mm) as shown in FIGS. 13(A) and 13(B).

Figure 15:
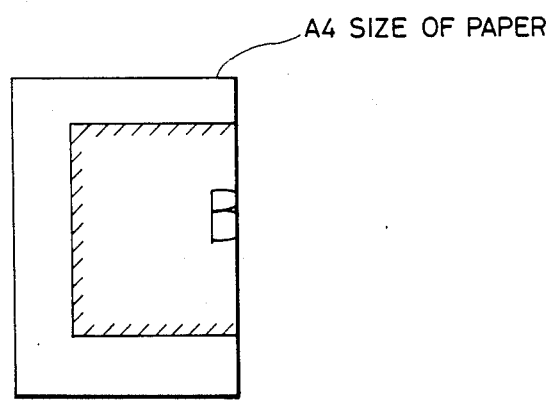
FIG. 15 is a plan view showing a print in case the size of the recording sheet is smaller than said image.

As an example, in case an A4-sized sheet is selected for the printer, if the image reading range defined by the cursors 41, 42 exceeds the frame (1) corresponding to the A4-size, the obtained print will show a partly lacking image as illustrated in FIG. 15. In order to avoid such inconvenience, there is conducted, prior to the image printing, a discrimination whether the values $l_{41}$ or $l_{42}$ calculated from the voltage $V_{41}$ or $V_{42}$ obtained from the cursor 41 or 42 exceeds $x_{P(1)}$, and, if such situation occurs, there will be given an alarm such as with a light-emitting diode or a buzzer in order to inform the operator of a need to replace the sheet cassette.

Figure 16:
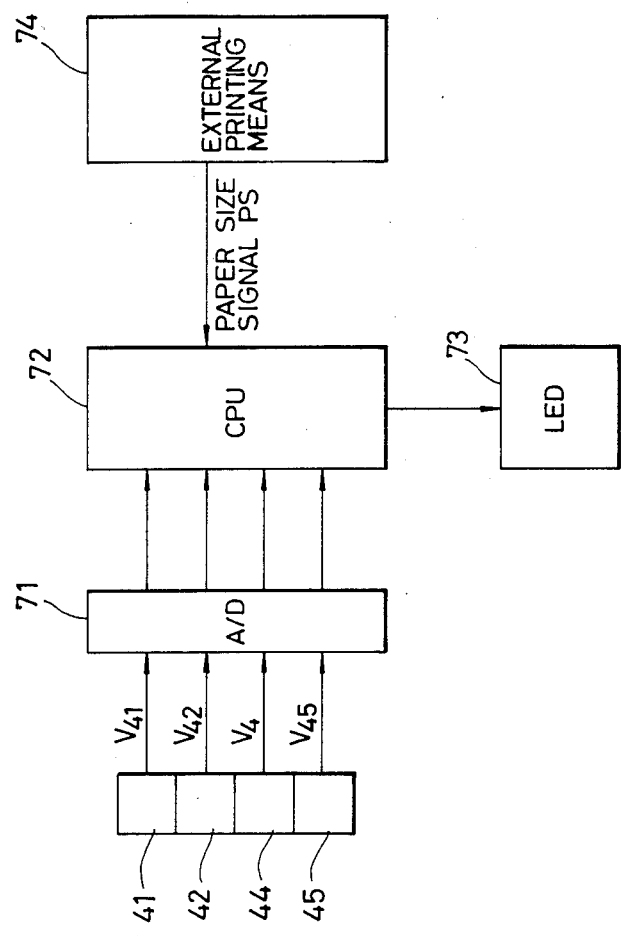
FIG. 16 is a block diagram showing a control circuit for said second embodiment of the present invention.

FIG. 16 illustrates an embodiment adapted for executing such operation, wherein provided are an analog-to-digital (A/D) converter 71 for converting the output voltages $V_{41}$, $V_{42}$, $V_{44}$, $V_{45}$ from the cursors 41, 42, 44, 45 into digital values and supplying the same to a central processing unit (CPU) 72; external printing means 74 such as a laser beam printer or a copier; and a light-emitting diode (LED) 73 for providing an alarm in response to an instruction signal from the CPU 72. A paper size signal PS is supplied from the external printing means 74 to the CPU 72. The CPU 72 is provided with an internal memory storing a control procedure, according to which the CPU 72 performs control operation.

Figure 17:
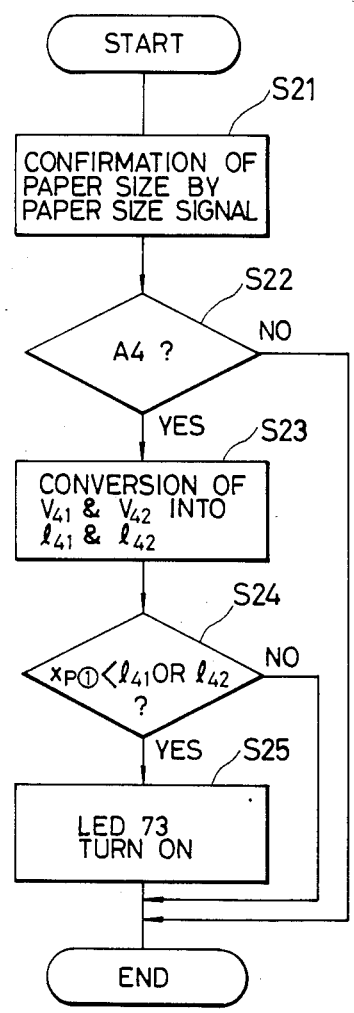
FIG. 17 is a flow chart showing an example of control procedure in the apparatus shown in FIG. 16.

Now reference is made to FIG. 17 for explaining the function of the apparatus shown in FIG. 16. At first a step S21 confirms the paper size currently employed, then a succeeding step S22 identifies whether said paper size is A4 size, and, if affirmative, a succeeding step S23 converts the output voltages $V_{41}$, $V_{42}$ into the lengths $l_{41}$, $l_{42}$. A succeeding step S24 identifies whether said length $l_{41}$ or $l_{42}$ is larger than $x_{P(1)}=210$ mm corresponding to the A4 size, and, if affirmative, a succeeding step S25 releases an alarm by lighting the LED 73 and prohibits the image reading operation. On the other hand, if the step S22 identifies that the sheet is not A4 size, the program proceeds to a next routine since the aforementioned inconvenience does not arise with an A3-sized sheet. Though the foregoing explanation has been limited to the use of A4- and A3-sized sheets, other sizes may naturally be likewise employed. Also the alarm by the indication with LED may be conveniently replaced by a buzzer alarm.

Furthermore, though the foregoing explanation has been limited to a case with a fixed image magnification, the present embodiment is also applicable to a case in which the image magnification is made variable by suitable means. Also the image reading means is not limited to a linear image sensor but can be composed of a two-dimensional image sensor, in which case a similar alarming function can be realized by establishing correspondence between the address on the screen and each element in the image sensor.

As explained in the foregoing, the partial lack in the printed image can be securely avoided by comparing the image reading range with the sheet size employed in the printing means and providing an alarm in case the former is identified larger.

Figure 19:
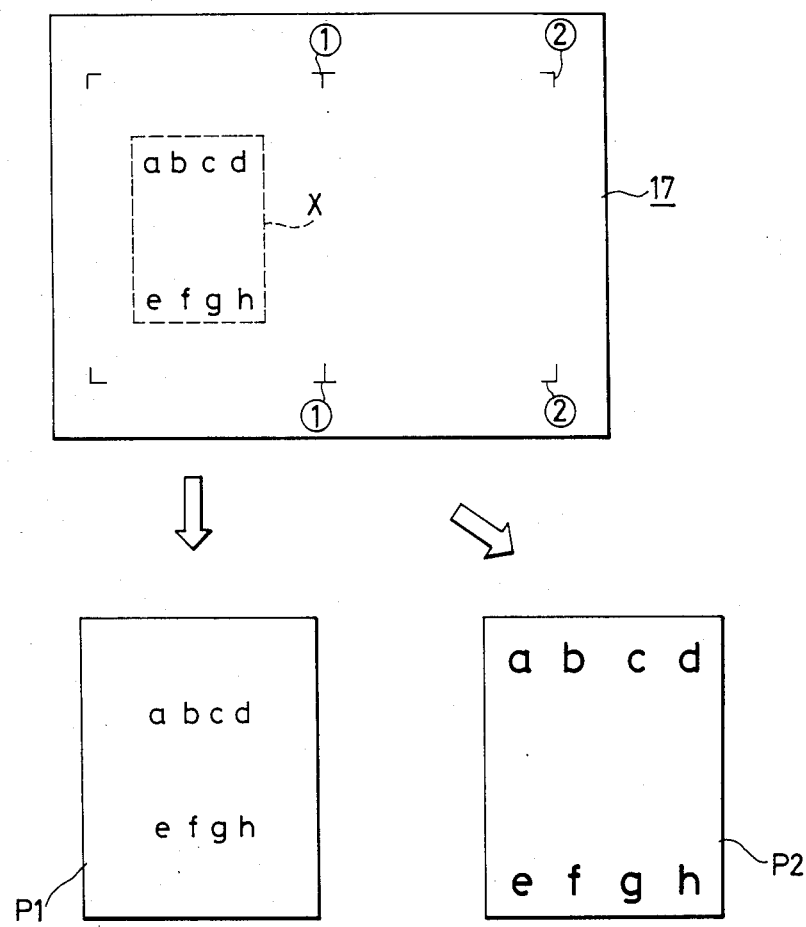
FIG. 19 is a schematic view showing the relationship between the content displayed on the screen and a print on the printing sheet.

On the other hand, if the image is considerably smaller than the reading frame on the screen as shown in FIG. 19, there will result a small printed image on the recording sheet P1 as shown in FIG. 18. In the following there will be explained, therefore, an embodiment in which such small image can be printed with an enlargement to the size of the recording sheet P2 with the image reading apparatus shown in FIG. 11.

Figure 20:
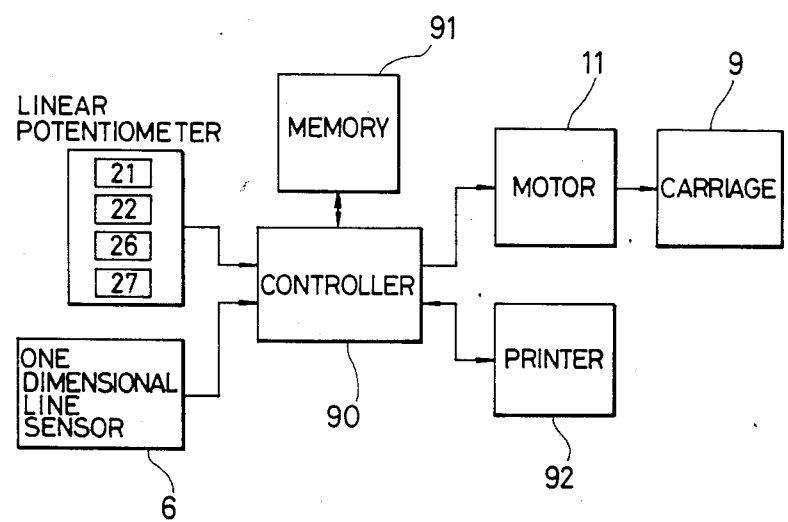
FIG. 20 is a block diagram showing a control circuit adaptable to the embodiment shown in FIG. 11.

FIG. 20 is a block diagram of a control circuit enabling image reading with variable image magnification. In FIG. 20 there are shown a controller 90 receiving the output signals from the linear potentiometers 61, 62, 63, 64 shown in FIG. 12 and controlling various components according to a predetermined procedure as shown in FIG. 21; a memory 91 for storing the output signals from the linear potentiometers 61, 62, 63, 64 and the results of various calculations; and printing means 92 such as a laser beam printer as shown in FIG. 3.

Figure 21:
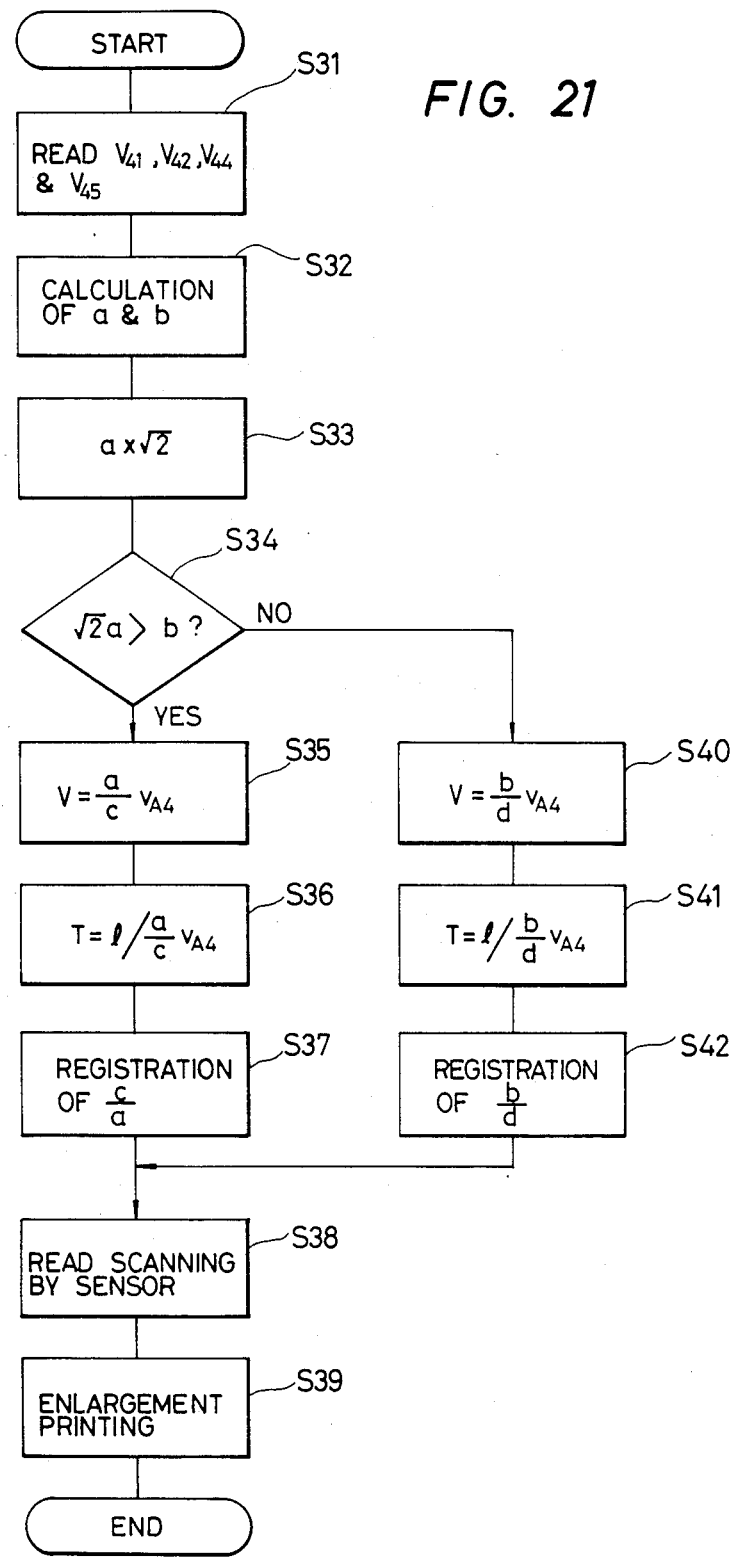
FIG. 21 is a flow chart showing the function of the control circuit shown in FIG. 20.

Now reference is made to a flow chart shown in FIG. 21, for explaining the sequence of enlarging an image area surrounded by the aforementioned cursors 41, 42, 44, 45 to the size of a recording sheet mounted on the printer 92.

It is now assumed that the sheet cassette mounted on the printer 92 contains A4-sized sheets in the vertically oblong position, corresponding to the vertically oblong reading frame (1) on the screen.

When a desired image area is defined by the operator with the cursors 41, 42, 44 and 45, a step S31 reads the voltages $V_{41}$, $V_{42}$ from the potentiometers 61, 62, and the voltages $V_{44}$, $V_{45}$ from the potentiometers 63, 64. Then a step S32 calculates the length a along the shorter side, as shown in FIG. 12, from said voltages $V_{42}$ and $V_{41}$, and the length b along the longer side from said voltages $V_{45}$ and $V_{44}$.

A succeeding step S33 multiplies $\sqrt{2}$ with said length a along the shorter side, and a step S34 compares the obtained value $\sqrt{2}$ with the length b along the longer side. As the ratio of the shorter side to the longer side is equal to 1 : $\sqrt{2}$ in the A4 size, the above-explained steps identifies whether the image magnification factor at the printing is to be determined by the length of shorter or longer side. The above-mentioned multiplying number can be varied according to the size and direction of the recording sheet mounted on the printer.

If $\sqrt{2}a > b$ is identified in the step S34, a step S35 determines a ratio a/c of the length a along the shorter side to the length along the shorter side of the reading frame (1) shown in FIG. 12, and multiplies said ratio a/c with the scanning speed $V_{A4}$ of the carriage 9 in case of printing the reading frame (1) on an A4-sized recording sheet on the printer 92 to obtain a value $a/c \cdot V_{A4}$, as the scanning speed V of the carriage 9. In this manner the step S35 determines the scanning speed V of the carriage 9 as follows:

$$V = a/c \cdot V_{A4}.$$

In this manner the scanning speed of the carriage 9 is modified according to the image magnification, thus varying the density of scanning lines of the linear image sensor and the image magnification in the subsidiary scanning direction.

Then a step S36 calculates the recording start time in the printer, or the delay time T as follows:

$$T = l/(a/c \cdot V_{A4})$$

whereby the recording start time is regulated according to the position of the desired image area, thus enabling to record the image always at a determined position on the recording sheet.

Then a step S37 registers a ratio c/a as the compensation factor for the output signals from the linear image sensor 6, or the image magnification factor in the main scanning direction. In this manner the number of information along the array of the linear image sensor 6 is increased by c/a.

A succeeding step S38 performs the image reading with the linear image sensor according to the above-explained conditions, and a step S39 prints the image of the desired area on the printer 92 with such magnification that the shorter side of said area is fully enlarged to the A4-sized recording sheet.

On the other hand, in case $\sqrt{2}a < b$ is identified in the step S34, the program proceeds to a step S40 to determine the ratio of the length b along the longer side to the length d along the longer side of the reading frame (1) shown in FIG. 12, and calculate the scanning speed V of the carriage 9 as follows:

$$V = b/d \cdot V_{A4}.$$

A succeeding step S41 calculates the delay time:

$$T = l/(b/d \cdot V_{A4}).$$

A succeeding step S42 registers a ratio b/d as the compensation factor for the output signals of the linear image sensor 6.

Then a step S38 performs the image reading with the linear image sensor according to the above-mentioned conditions, and a step S39 prints the image of the desired area on the printer 92 with such magnification that the longer side of said area is fully enlarged to the A4-sized recording sheet.

In case the recording sheet mounted on the printer 92 is other than A4 size or positioned vertically oblong, said scanning speed $V_{A4}$ for the A4 size is replaced by one plural scanning speeds stored in advance in said memory corresponding to various sizes or directions of the recording sheet. Also in case the recording sheet is too small to accommodate the entire image, an image reduction is effected as explained before for the image area defined by the cursors.

The foregoing embodiment allows the operator to securely obtain a desired image, since the image magnification and image reading start position can be automatically determined according to the image reading range and the recording sheet size, by simply defining the image reading area with designating means such as cursors on a display unit. Also a frame erasure can be easily achieved if the area outside the designated image area is left unprinted.

The combination of cursors and linear potentiometers employed in the foregoing embodiment may be replaced by other means such as touch-sensor panel or LED scanning. Also the optical screen employed as the display unit in the foregoing embodiment can be replaced by a cathode ray tube. In such case a mouse or the like may be adopted for defining the desired image area, thus determining the scanning speed and compensation factor to achieve a similar recording operation.

The efficiency at the image printing can be significantly improved since the size and position of the recording are automatically determined according to the designation of a desired image area on the display means and the selection of the size of recording sheet.

Though the foregoing explanation has been limited to the reading of drawings or characters recorded on a sheet-shaped or web-shaped microfilm, the present invention is by no means limited to such embodiment but is applicable to the reading of an image recorded on an ordinary 35 mm film or an X-ray film.

The image reading operation in the foregoing explanation has been achieved by moving a linear image sensor, but it is also possible to move the film with respect to a fixed linear image sensor, or to employ a two-dimensional image sensor.

Also the image signals obtained by image reading can be supplied not only to a printer such as a laser beam printer or an ink jet printer, but also to an image file equipped with an optical disk or to a computer.

The present invention has been explained by specific embodiments, but it is subject to various modifications within the scope and spirit of the appended claims.

What is claimed is:

1. A film image processing apparatus comprising:
   reading means for reading an original image on a film and for outputting image signals;
   means for displaying an image enlarging the original image;
   means for designating an arbitrary position in the image displayed on said display means; and
   means for controlling the image reading area of said reading means in accordance with and after the designation of said arbitrary position by said designating means.

2. A film image processing apparatus according to claim 1, wherein said control means is adapted to control the start of image reading by said reading means, in accordance with the designation of said designating means.

3. A film image processing apparatus according to claim 1, wherein said control means causes said reading means to output the image signals of the image reading area.

4. A film image processing apparatus according to claim 1, wherein said reading means comprises a linear image sensor capable of photoelectrical conversion of the light transmitted by a film.

5. A film image processing apparatus according to claim 1, wherein said designating means comprises movable indicator element or elements close to the display face of said display means.

6. A film image processing apparatus according to claim 1, wherein said display means comprises a screen onto which the light transmitted by the film is optically projected.

7. A film image processing apparatus comprising:
   reading means for reading an original image on a film and for outputting image signals;
   means for displaying an image enlarging the original image;
   means for designating an arbitrary area of the image displayed on said display means; and
   means for extracting image signals representing the arbitrary area of the image designated by the designating means from the image signals outputted from said reading means.

8. A film image processing apparatus according to claim 7, further comprising control means for controlling the start of the image reading operation by said reading means.

9. A film image processing apparatus according to claim 7, wherein said reading means comprises a linear image sensor capable of photoelectrical conversion of the light transmitted by a film.

10. A film image processing apparatus according to claim 7, wherein said designating means comprises movable indicator element or elements close to the display face of said display means.

11. A film image processing apparatus according to claim 7, wherein said display means comprises a screen onto which the light transmitted by a film is optically projected.

12. A film image processing apparatus according to claim 7, further comprising means for recording an image on a recording material, according to the image signals from said reading means.

13. A film image processing apparatus comprising:
   reading means for reading an original image on a film and for outputting image signals;
   means for displaying an image enlarging the original image;
   means for designating an arbitrary position of the image displayed on said display means;
   means for recording an image on a recording material based on the image signals from said reading means; and
   means for controlling the image reading area of said reading means in accordance with the position designated by said designating means and the size of an image to be recorded by the recording material.

14. A film image processing apparatus according to claim 13, wherein said control means is adapted to control the start and end positions of image reading by said reading means.

15. A film image processing apparatus according to claim 13, wherein said control means performs said control based on the count of signals synchronized with the image recording of said recording means.

16. A film image processing apparatus according to claim 13, wherein said control means controls the image reading area of said reading means in accordance with the position designated by said designating means and the size of the recording material.

17. A film image processing apparatus according to claim 13, wherein said reading means comprises a linear image sensor capable of photoelectrical conversion of the light transmitted by a film.

18. A film image processing apparatus according to claim 13, wherein said designating means comprises movable indicator element or elements close to the display face of said display means.

19. A film image processing apparatus according to claim 13, wherein said display means comprises a screen onto which the light transmitted by the film is optically projected.

20. A film image processing apparatus comprises:
   reading means for reading an original image on a film and for outputting image signals;
   means for displaying an image enlarging the original image;
   means for designating an arbitrary area of the image displayed on said display means;
   means for recording an image of the arbitrary area designated by said designating means on a recording material according to the image signals from the reading means; and
   means for discriminating whether the size of the image of the arbitrary area designated by said designating means matches the size of the recording material.

21. A film image processing apparatus according to claim 20, further comprising display means for displaying the result of discrimination by said discriminating means.

22. A film image processing apparatus according to claim 20, further comprising control means for causing said reading means to output the image signals representing an image of the arbitrary area designated by said designating means.

23. A film image processing apparatus according to claim 20, wherein said reading means comprises a linear image sensor capable of photoelectrical conversion of the light transmitted by a film.

24. A film image processing apparatus according to claim 20, wherein said designating means comprises plural movable indicator members positioned close to the image display face of said display means.

25. A film image processing apparatus according to claim 20, wherein said display means comprises a screen onto which the light transmitted by the film is optically projected.

26. A film image processing apparatus comprising:
   reading means for reading an original iamge and for outputting image signals;
   means for displaying an image enlarging the original image;
   means for designating an arbitrary area of the image displayed on said display means;

means for recording the image of the area designated by said designating means on a recording material, and for varying the image magnification, in accordance with the image signals supplied from said reading means; and means for determining the image magnification factor at the image recording by said recording means, in accordance with the image size of the arbitrary area designated by said designating means and with the size of the recording material.

27. A film image processing apparatus according to claim 26, wherein said determining means is adapted to determine the image magnification in such a manner that the image in the designated area is accommodated in the recording material.

28. A film image processing apparatus according to claim 26, further comprising control means for causing said reading means to output image signals representing an image of the arbitrary area designated by said designating means.

29. A film image processing apparatus according to claim 26, wherein said reading means comprises a linear image sensor capable of photoelectrical conversion of the light transmitted by a film.

30. A film image processing apparatus according to claim 26, wherein said designating means comprises plural movable indicator members positioned close to the image display face of said display means.

31. A film image processing apparatus according to claim 26, wherein said display means comprises a screen onto which the light transmitted by the film is optically projected.

* * * * *

UNITED STATES PATENT AND TRADEMARK OFFICE
CERTIFICATE OF CORRECTION

PATENT NO. : 4,700,237
DATED : October 13, 1987
INVENTOR(S) : KIYOHARU YOSHIOKA, ET AL.

It is certified that error appears in the above-identified patent and that said Letters Patent is hereby corrected as shown below:

COLUMN 1

Line 56, "image," should read --image is more difficult--.

COLUMN 4

Line 58, "cassette" should read --cassettes--.

COLUMN 5

Line 11, "photosensor" should read --photointerrupter--.
    Line 67, "corelated" should read --correlated--.

COLUMN 6

Line 35, "with" should read --by--.
    Lines 38-39, "53" should read --53 is performed--.

COLUMN 7

Line 67, "lead-hand" should read --left-hand--.

COLUMN 11

Line 9, "identifies" should read --identify--.

COLUMN 12

Line 10, "one plural" should read --one of plural--.

UNITED STATES PATENT AND TRADEMARK OFFICE
CERTIFICATE OF CORRECTION

PATENT NO. : 4,700,237

DATED : October 13, 1987

INVENTOR(S) : KIYOHARU YOSHIOKA, ET AL.

It is certified that error appears in the above-identified patent and that said Letters Patent is hereby corrected as shown below:

COLUMN 14

Line 26, "comprises:" should read --comprising:--.
Line 63, "iamge" should read --image--.

Signed and Sealed this

Second Day of February, 1988

Attest:

DONALD J. QUIGG

Attesting Officer

Commissioner of Patents and Trademarks